US007008211B2

(12) United States Patent
Lee (10) Patent No.: US 7,008,211 B2
(45) Date of Patent: Mar. 7, 2006

(54) MOLDING ASSEMBLY

(75) Inventor: Jung-Chou Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 98 days.

(21) Appl. No.: 10/838,369

(22) Filed: May 5, 2004

(65) Prior Publication Data

US 2005/0153013 A1    Jul. 14, 2005

(30) Foreign Application Priority Data

Jan. 13, 2004   (TW) .............................. 93100779 A (51) Int. Cl.
*B29C 45/73*   (2006.01)
(52) U.S. Cl. ........................ 425/190; 425/552; 425/588
(58) Field of Classification Search ................ 425/190, 425/552, 588, 808; 249/81; 264/328.8, 264/328.16
See application file for complete search history.

(56) References Cited

U.S. PATENT DOCUMENTS 5,744,173 A * 4/1998 Sterett ........................ 425/144
5,827,548 A * 10/1998 Lavallee et al. ............. 425/116
6,196,830 B1 * 3/2001 Foltuz et al. ................ 425/552
6,322,350 B1 * 11/2001 Voets et al. .................. 425/548
6,537,053 B1 * 3/2003 Watkins ....................... 425/190

\* cited by examiner

*Primary Examiner*—Donald Heckenberg (74) *Attorney, Agent, or Firm*—Banner & Witcoff, Ltd.

(57) ABSTRACT

A molding assembly includes a mold body, an insert block, and a cooling channel. The mold body has first and second surfaces which are opposite to each other, and a peripheral surface interconnecting the first and second surfaces. The mold body further has a plurality of die cavities, a plurality of runners, and a recess opening at the first surface. The recess extends from the first surface toward the second surface, and ends at a recess bottom surface disposed away from the first surface. The insert block is fitted within the recess and has an inner surface confronting the recess bottom surface, an outer surface opposite to the inner surface, and a side wall interconnecting the inner and outer surfaces. The cooling channel is confined by the recess bottom surface of the recess and the inner surface of the insert block.

11 Claims, 8 Drawing Sheets

MOLDING ASSEMBLY

CROSS-REFERENCE TO RELATED APPLICATION

This application claims priority of Taiwanese Application No. 093100779, filed on Jan. 13, 2004.

BACKGROUND OF THE INVENTION

1. Field of the Invention

The invention relates to a molding assembly, and more particularly to a molding assembly with a cooling channel.

2. Description of the Related Art

Figure 1:
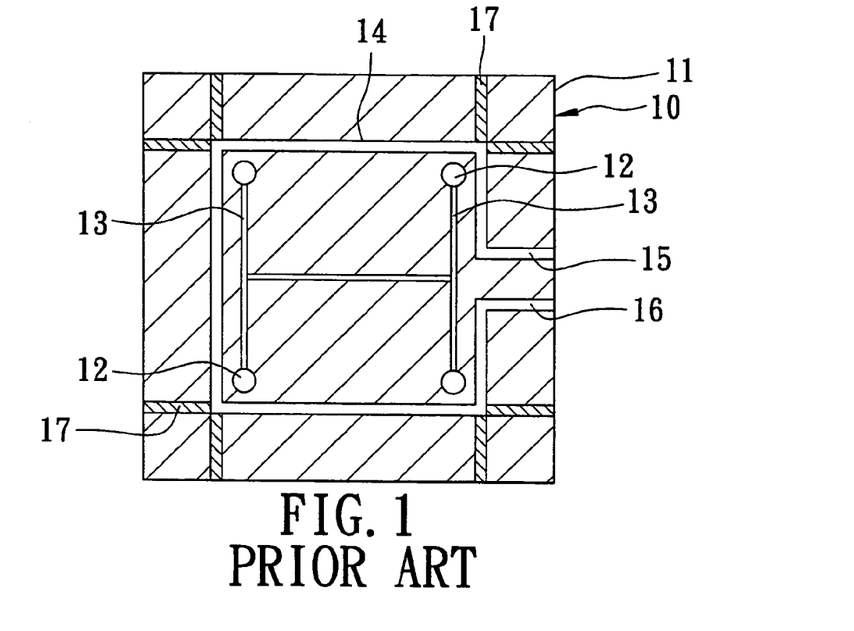
FIG. 1 is a cross-sectional view of a conventional molding device having die cavities arranged in a square array.

Referring to FIG. 1, a conventional molding device 10 for molding a plastic lens is shown to include a mold body 11 which has a plurality of die cavities 12, a plurality of runners 13 to intercommunicate fluidly the die cavities 12, and a cooling channel 14 proximate to the die cavities 12. The mold body 11 further has a coolant inlet 15 and a coolant outlet 16, both of which are communicated with the cooling channel 14.

Figure 2:
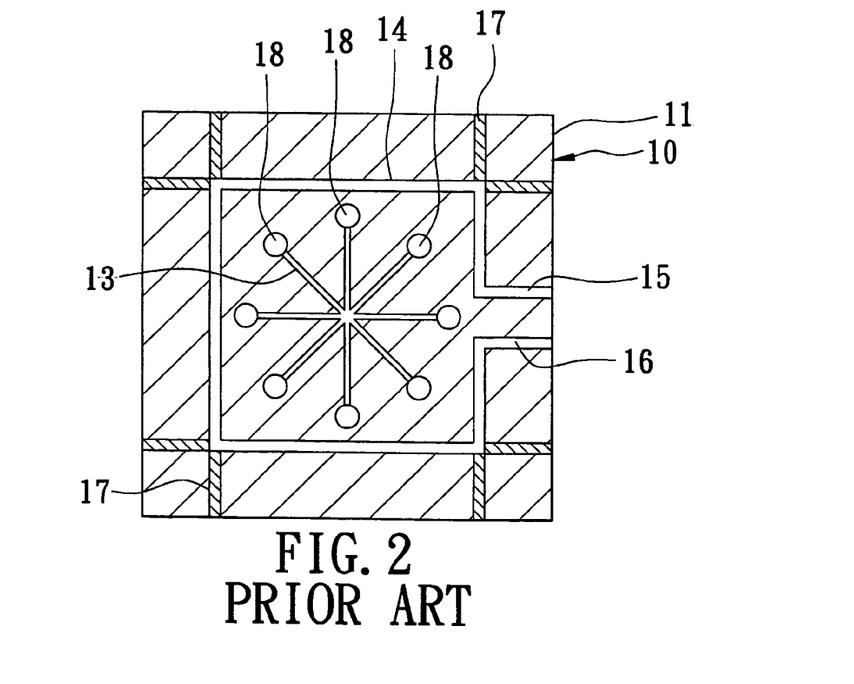
FIG. 2 is a cross-sectional view of another conventional molding device having die cavities arranged in an annular formation.
Figure 3:
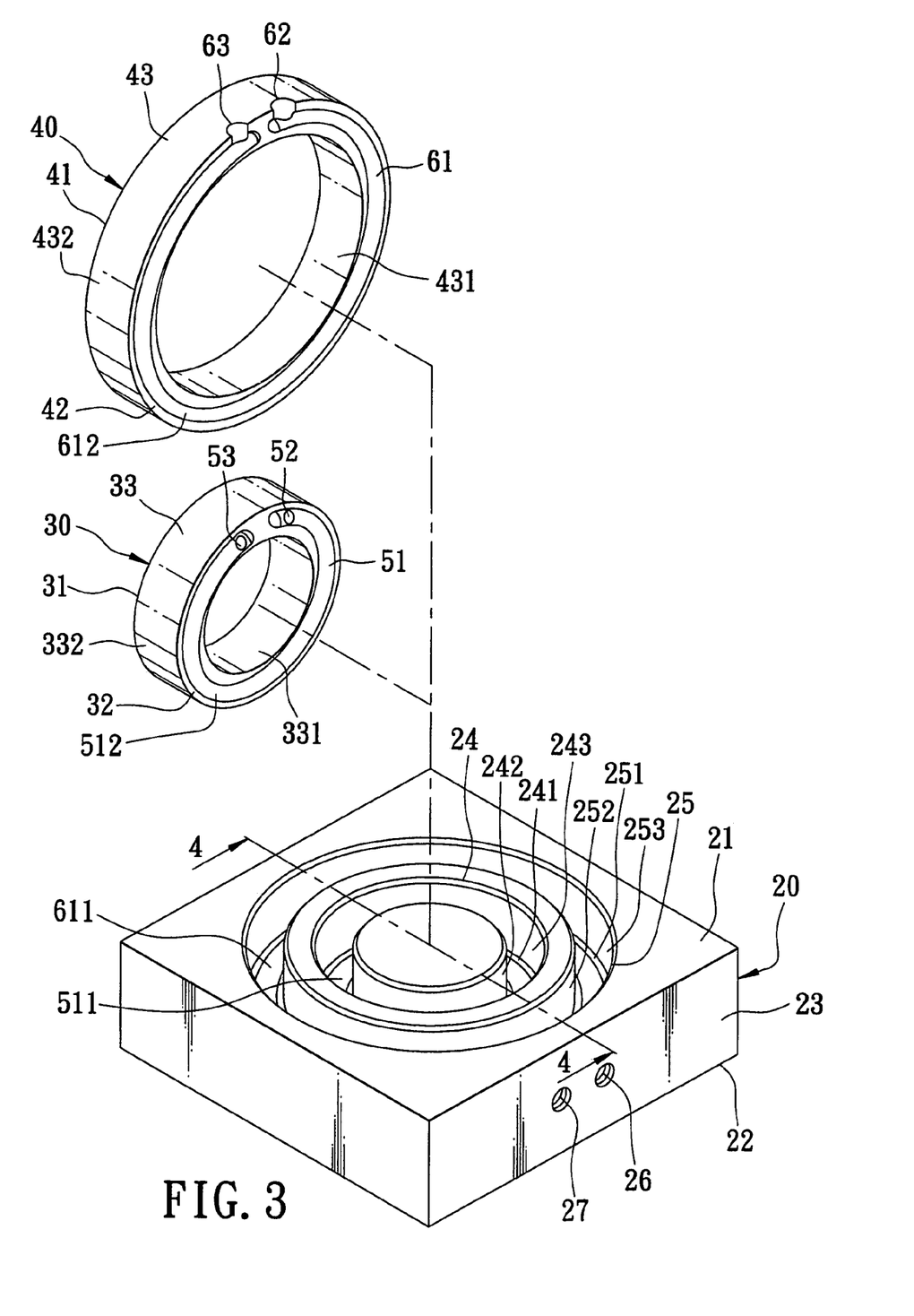
FIG. 3 is an exploded perspective view of the first preferred embodiment of a molding assembly according to this invention.
Figure 4:
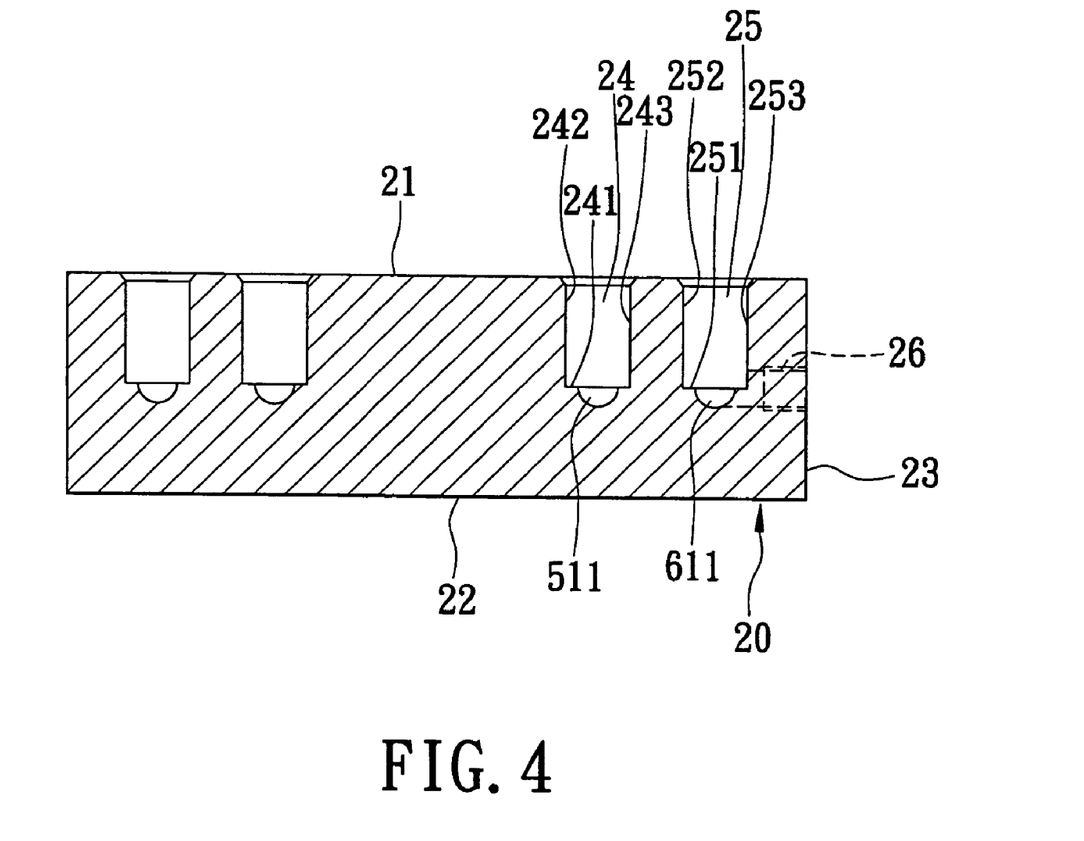
FIG. 4 is a sectional view taken along line 4—4 in FIG. 3.
Figure 5:
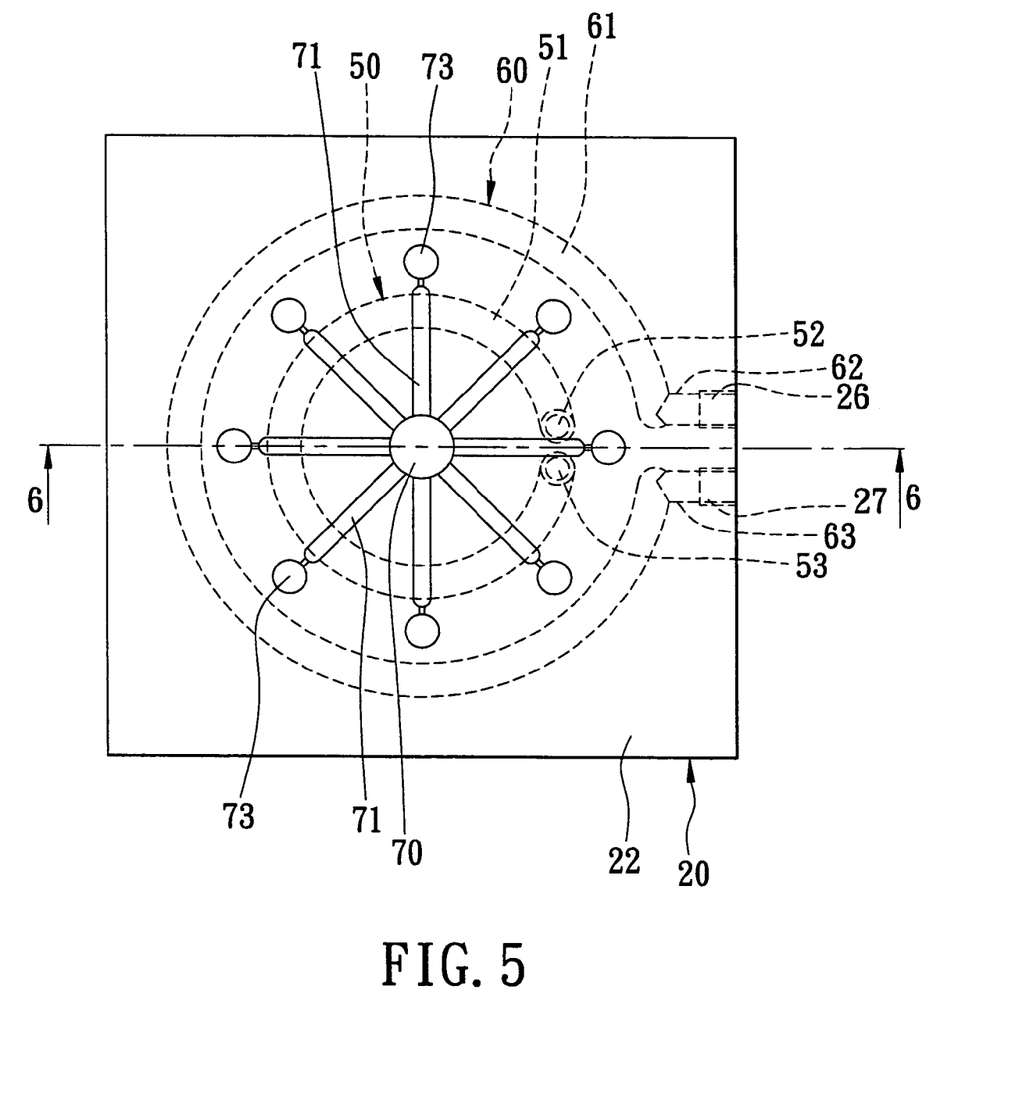
FIG. 5 is a top schematic view of the first preferred embodiment.

The cooling channel 14 is made by drilling the mold body 11 to form perforating holes and then plugging the perforating holes at end portions thereof with the use of plugs 17. Referring to FIG. 2, when the molding device 10 is formed with a plurality of die cavities 18 arranged in an annular array, since the drilling process is only suitable for forming the cooling channel 14 including a plurality of linear channel sections, the distances of the die cavities 18 from the cooling channels 14 are unequal, which in turn results in an uneven cooling effect for the die cavities 18. Therefore, the molding temperatures of the die cavities 18 may differ from each other, which results in the production of molded products having inferior properties.

SUMMARY OF THE INVENTION

Therefore, the object of the present invention is to provide a molding assembly having a cooling channel, which provides a uniform cooling effect to die cavities contained within the molding assembly.

According to this invention, a molding assembly includes a mold body, an insert block, and a cooling channel. The mold body has first and second surfaces which are opposite to each other, and a peripheral surface interconnecting the first and second surfaces. The body further has a plurality of die cavities, a plurality of runners to intercommunicate fluidly the die cavities, and a recess opening at the first surface. The recess extends from the first surface toward the second surface, and ends at a recess bottom surface disposed away from the first surface. The insert block is fitted within the recess, and has an inner surface confronting the recess bottom surface, an outer surface opposite to the inner surface, and a side wall interconnecting the inner and outer surfaces. The cooling channel is confined by the recess bottom surface of the recess and the inner surface of the insert block.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Referring to FIGS. 3, 4, 5, and 6, the first preferred embodiment of the molding assembly according to this invention is shown to include a mold body 20, a first insert block 30, a second insert block 40, a first cooling channel 50, and a second cooling channel 60.

The mold body 20 has first and second surfaces 21,22 which are opposite to each other, and a peripheral surface 23 interconnecting the first and second surfaces 21,22. The mold body 20 further has a plurality of die cavities 73, a plurality of runners 71 to intercommunicate fluidly the die cavities 73, and first and second recesses 24,25 opening at the first surface 21. The first recess 24 extends from the first surface 21 toward the second surface 22, and ends at a recess bottom surface 241 disposed away from the first surface 21. The first recess 24 further has first and second sidewall surfaces 242,243 opposite to each other and extending from the recess bottom wall 241 to the first surface 21 of the mold body 20. Likewise, the second recess 25 extends from the first surface 21 toward the second surface 22, and ends at a recess bottom surface 251 disposed away from the first surface 21. The second recess 25 further has first and second sidewall surfaces 252,253 opposite to each other and extending from the recess bottom wall 251 to the first surface 21 of the mold body 20. The first and second recesses 24,25 are spaced apart from each other.

The first insert block 30 is fitted snugly within the first recess 24, and has an inner surface 32 confronting the recess bottom wall 241 of the first recess 24, an outer surface 31 opposite to the inner surface 32, and a side wall 33 interconnecting the inner and outer surfaces 32,31. The first insert block 30 is configured as a loop member. The side wall 33 of the first insert block 30 includes a looped inner sidewall surface 331 and a looped outer sidewall surface 332 surrounding the inner sidewall surface 331. Each of the inner and outer sidewall surfaces 331,332 has two opposite ends connected respectively to the inner and outer surfaces 32,31 of the first insert block 30. The first insert block 30 has a shape substantially corresponding to that of the first recess 24.

Likewise, the second insert block 40 is fitted snugly within the second recess 25, and has an inner surface 42 confronting the recess bottom wall 251 of the second recess 25, an outer surface 41 opposite to the inner surface 42, and a side wall 43 interconnecting the inner and outer surfaces 42,41. The second insert block 40 is configured as a loop member. The side wall 43 of the second insert block 40 includes a looped inner sidewall surface 431 and a looped outer sidewall surface 432 surrounding the inner sidewall surface 431. Each of the inner and outer sidewall surfaces 431,432 has two opposite ends connected respectively to the inner and outer surfaces 42,41 of the first insert block 40. The second insert block 40 has a shape substantially corresponding to that of the second recess 25.

The first cooling channel 51 is confined by the recess bottom surface 241 of the first recess 24 and the inner surface 32 of the first insert block 30. The first insert block 30 further includes a coolant inlet 52 and a coolant outlet 53, both of which extend from the outer surface 31 of the first insert block 30 to the first cooling channel 51.

The second cooling channel 61 is confined by the recess bottom surface 251 of the second recess 25 and the inner surface 42 of the second insert block 40. The second insert block 40 further includes a coolant inlet 62 and a coolant outlet 63, both of which extend from the outer sidewall surface 432 of the second insert block 40 to the second cooling channel 61. The mold body 20 further includes two holes 26,27 which open at the peripheral surface 23, and which are communicated respectively with the coolant inlet 62 and the coolant outlet 63.

Figure 6:
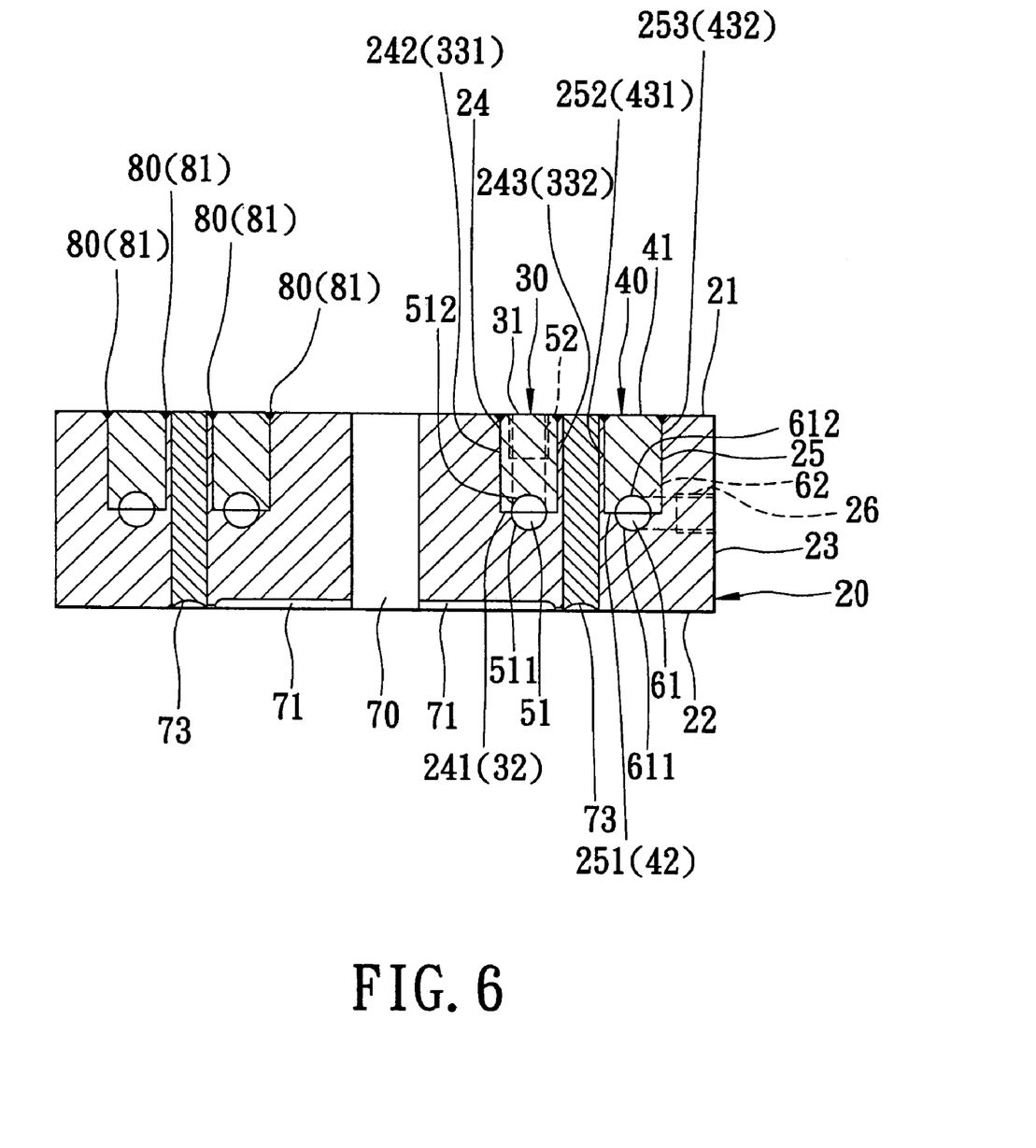
FIG. 6 is a sectional view taken along line 6—6 in FIG. 5.

Specifically referring to FIG. 6, in the first preferred embodiment, the recess bottom surface 241 of the first recess 24 and the inner surface 32 of the first insert block 30 are formed respectively with concavities 511,512 which complement each other to define the first cooling channel 51. Likewise, the recess bottom surface 251 of the second recess 25 and the inner surface 42 of the second insert block 40 are formed respectively with concavities 612,611 which complement each other to define the second cooling channel 61. Preferably, each of the concavities 511,512,611,612 is formed as a semi-circular sectional configuration.

Figure 7:
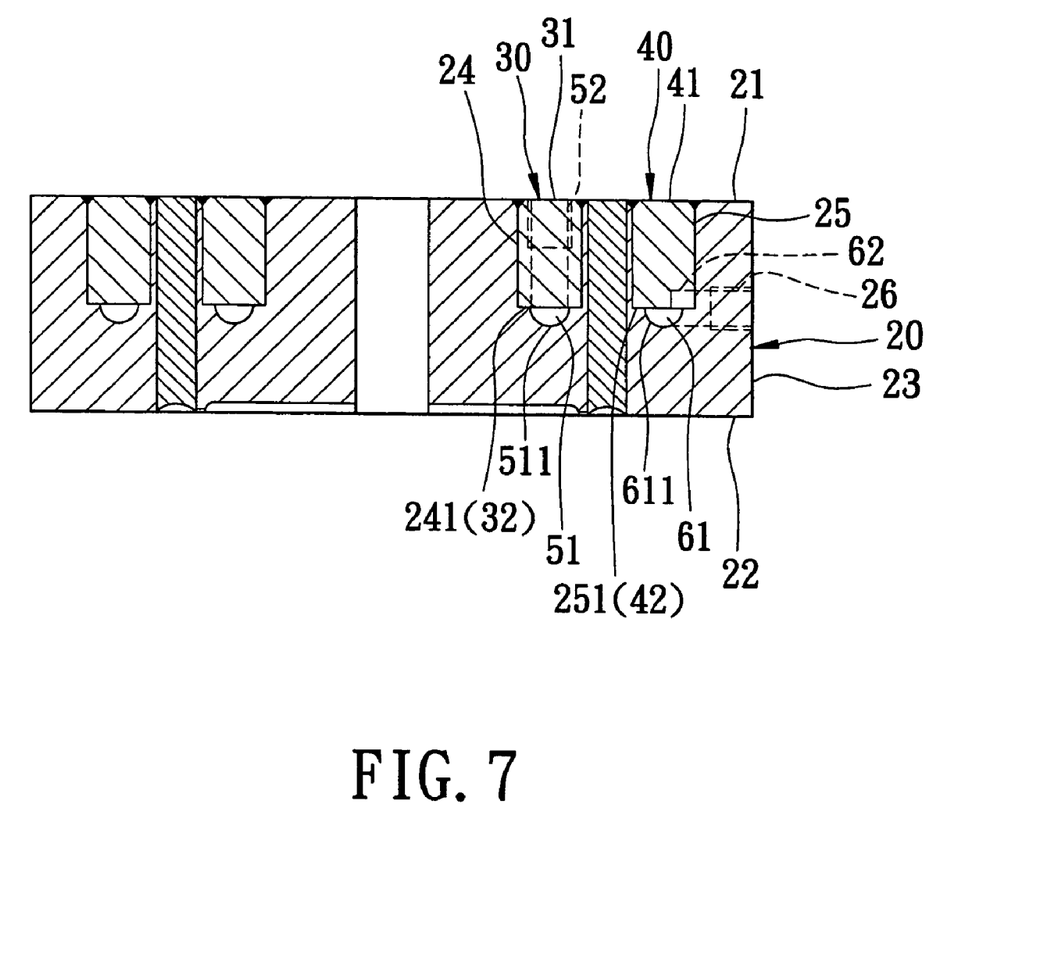
FIG. 7 is a sectional view of the second preferred embodiment of a molding assembly according to this invention.

Referring to FIG. 7, in the second preferred embodiment of the molding assembly according to this invention, the recess bottom surface 241 of the first recess 24 is formed with a concavity 511 cooperating with the inner surface 32 of the first insert block 30 to define the first cooling channel 51. Likewise, the recess bottom surface 251 of the second recess 25 is formed with a concavity 611 cooperating with the inner surface 42 of the second insert block 40 to define the second cooling channel 61.

Figure 8:
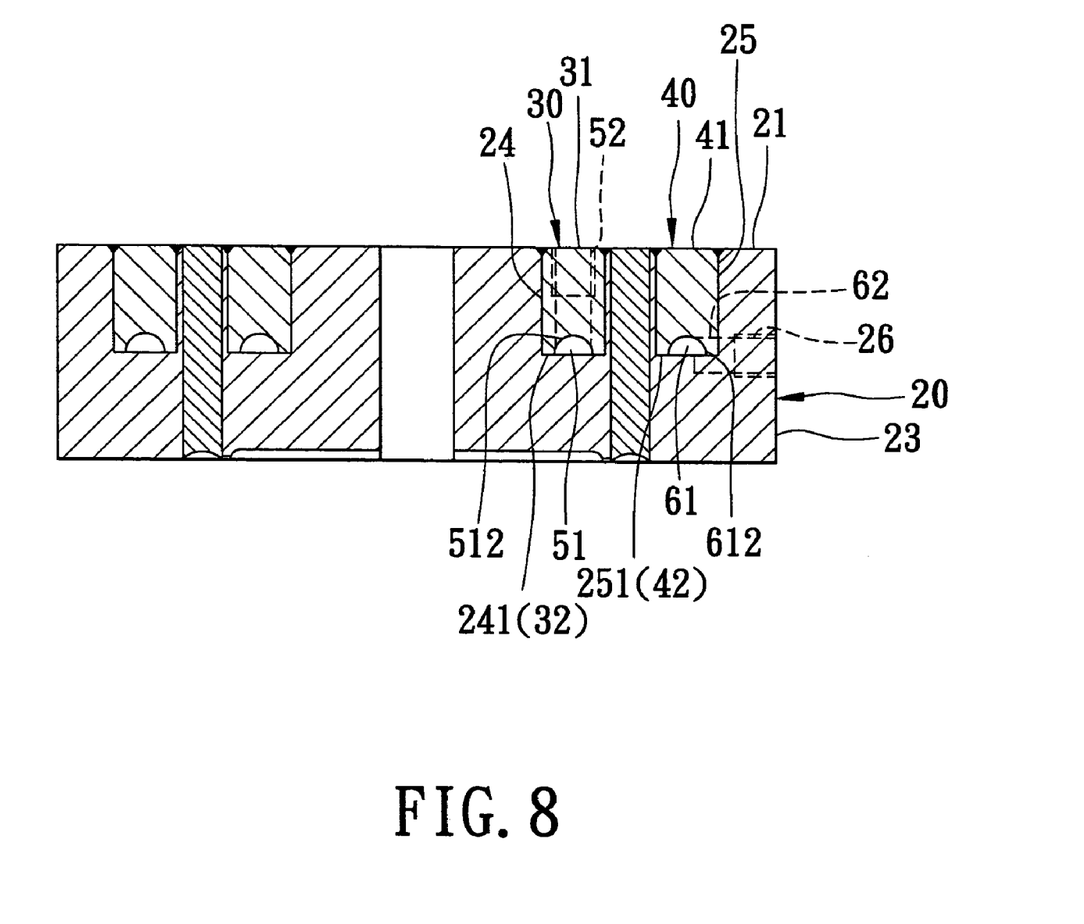
FIG. 8 is a sectional view of the third preferred embodiment of a molding assembly according to this invention.

Referring to FIG. 8, in the third preferred embodiment of the molding assembly according to this invention, the inner surface 32 of the first insert block 30 is formed with a concavity 512 cooperating with the recess bottom surface 241 of the first recess 24 to define the first cooling channel 51. Likewise, the inner surface 42 of the second insert block 40 is formed with a concavity 612 cooperating with the recess bottom surface 251 of the second recess 25 to define the second cooling channel 61.

The concavities 511,512,611,612 are formed by a milling process according to the desired configurations thereof. For example, in the aforesaid preferred embodiments, the first and second insert blocks 30,40 have annular shapes, respectively. The die cavities 73 are arranged in an annular formation at intervals and are spaced apart from the first and second cooling channels 51,61 at equal distances.

Referring again to FIG. 6, the molding assembly further includes sealing members 81 disposed on the outer surfaces 31,41 of the first and second insert blocks 30,40 along the inner sidewall surfaces 331,431 and the outer sidewall surfaces 332,432, respectively. Furthermore, the outer surfaces 31,41 of the first and second insert blocks 30,40 are substantially flush with the first surface 21 of the mold body 20. The sealing members 81 extend between the outer surface 31 of the first insert block 30 and the first surface 21 of the mold body 20, and between the outer surface 41 of the second insert block 40 and the first surface 21 of the mold body 20. Preferably, the outer surface 31 of the first insert block 30 and the first surface 21 of the mold body 20 are formed with indentations 80 along the inner and outer sidewall surfaces 331,332 of the first insert block 30 to receive the sealing members 81. Likewise, the outer surface 41 of the second insert block 40 and the first surface 21 of the mold body 20 are formed with indentations 80 along the inner and outer sidewall surfaces 431,432 of the second insert block 40 to receive the sealing members 81. Therefore, the first and second insert blocks 30, 40 are bonded firmly to the mold body 20 by soldering with the use of the sealing members 81 so as to prevent coolant material from leaking.

Referring again to FIGS. 5 and 6, after the first and second insert blocks 30,40 are fitted respectively within the first and second recesses 24,25, followed by soldering the first and second insert blocks 30,40 to the mold body 20, a perforating hole 70 extending between the first and second surfaces 21,22 of the mold body 20 is further provided at the center of the mold body 20. The runners 71 extend radially from the perforating hole 70 to a respective one of the die cavities 73.

In the aforesaid preferred embodiments, while the runners 71 and the die cavities 73 are preferably provided at the second surface 22 of the mold body 20, they can be provided at the first surface 21 of the mold body 20, if desired.

When two of the molding assemblies are assembled in a manner of an opposite arrangement and are mounted on an injection molder (not shown), the die cavities 73 are spaced apart from the first and second cooling channels 51,61 at equal distances from the first and second cooling channels 51,61. Therefore, the molding temperature for each of the die cavities 73 is substantially uniform so that the quality of the molded products produced can be ensured.

Figure 9:
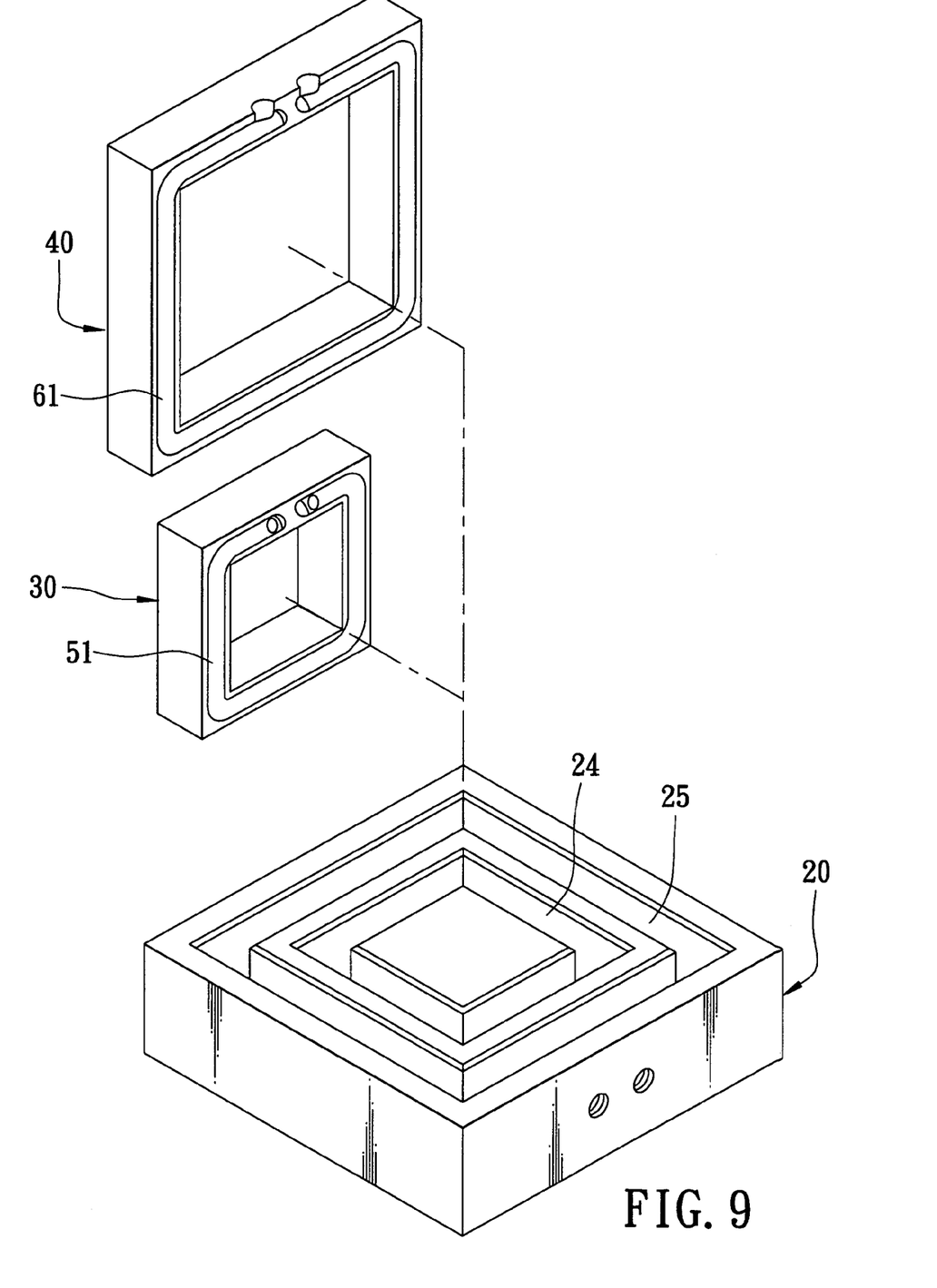
FIG. 9 is an exploded perspective view of the fourth preferred embodiment of a molding assembly according to this invention.

Referring to FIG. 9, the fourth preferred embodiment of the molding assembly according to this invention is shown, in which each of the first and second insert blocks 30,40 has a rectangular shape. The first and second recesses 24,25 are formed in shapes substantially corresponding to those of the first and second insert blocks 30,40, respectively. The die cavities (not shown) of the molding assembly have an arrangement similar to that shown in FIG. 1.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A molding assembly comprising:
a mold body having first and second surfaces which are opposite to each other, and a peripheral surface interconnecting said first and second surfaces, said mold body further having a plurality of die cavities, a plurality of runners to intercommunicate fluidly said die cavities, and a recess opening at said first surface, said recess extending from said first surface toward said second surface and ending at a recess bottom surface disposed away from said first surface;
an insert block fitted within said recess and having an inner surface confronting said recess bottom surface, an outer surface opposite to said inner surface, and a side wall interconnecting said inner and outer surfaces; and a cooling channel confined by said recess bottom surface of said recess and said inner surface of said insert block.

2. The molding assembly as claimed in claim 1, wherein said recess bottom surface of said recess and said inner surface of said insert block are formed respectively with concavities which complement each other to define said cooling channel.

3. The molding assembly as claimed in claim 1, wherein one of said recess bottom surface of said recess and said inner surface of said insert block is formed with a concavity to define said cooling channel.

4. The molding assembly as claimed in claim 1, wherein said insert block further includes a coolant inlet and a coolant outlet, both of which extend from said outer surface of said insert block to said cooling channel.

5. The molding assembly as claimed in claim 1 wherein said insert block further includes a coolant inlet and a coolant outlet both of which extend from said side wall of said insert block to said cooling channel, said mold body further including two holes which open at said peripheral surface, and which are communicated respectively with said coolant inlet and said coolant outlet.

6. The molding assembly as claimed in claim 1, wherein said insert block is configured as a loop member, and said side wall has a looped inner sidewall surface and a looped outer sidewall surface surrounding said inner sidewall surface, each of said inner and outer sidewall surfaces having two opposite ends connected respectively to said inner and outer surfaces, said insert block having a shape substantially corresponding to that of said recess.

7. The molding assembly as claimed in claim 6, further comprising sealing members disposed on said outer surface of said insert block along said inner and outer sidewall surfaces, respectively.

8. The molding assembly as claimed in claim 7, wherein said outer surface of said insert block is substantially flush with said first surface of said mold body, said sealing members extending between said outer surface of said insert block and said first surface of said mold body.

9. The molding assembly as claimed in claim 8, wherein said outer surface of said insert block and said first surface of said mold body are formed with indentations along said inner and outer sidewall surfaces of said insert block to receive said sealing members.

10. The molding assembly as claimed in claim 6, wherein said insert block has a rectangular shape.

11. The molding assembly as claimed in claim 6, wherein said insert block has an annular shape, said die cavities being arranged in an annular formation at intervals and being spaced apart from said cooling channel at equal distances.

* * * * *